(12) United States Patent
Lee et al.

(10) Patent No.: US 10,126,953 B2
(45) Date of Patent: Nov. 13, 2018

(54) MEMORY MANAGEMENT METHOD FOR BUFFER MEMORY, AND MEMORY CONTROL CIRCUIT UNIT AND MEMORY STORAGE DEVICE USING THE SAME

(71) Applicant: Hefei Core Storage Electronic Limited, Anhui Province (CN)

(72) Inventors: Hao-Zhi Lee, Miaoli County (TW);
Qi-Ao Zhu, Anhui Province (CN);
Chong Peng, Anhui Province (CN);
Hui Xie, Anhui Province (CN)

(73) Assignee: Hefei Core Storage Electronic Limited, Anhui Province (CN)

( * ) Notice: Subject to any disclaimer, the term of this patent is extended or adjusted under 35 U.S.C. 154(b) by 136 days.

(21) Appl. No.: 15/334,305

(22) Filed: Oct. 26, 2016

(65) Prior Publication Data
US 2018/0059934 A1 Mar. 1, 2018

(30) Foreign Application Priority Data
Aug. 26, 2016 (CN) .......................... 2016 1 0736221

(51) Int. Cl.
*G06F 12/00* (2006.01)
*G06F 3/06* (2006.01)

(52) U.S. Cl.
CPC ............ *G06F 3/061* (2013.01); *G06F 3/0655* (2013.01); *G06F 3/0679* (2013.01)

(58) Field of Classification Search
CPC ....... G06F 3/061; G06F 3/0655; G06F 3/0679
See application file for complete search history.

(56) References Cited

U.S. PATENT DOCUMENTS

2009/0070520 A1* 3/2009 Mizushima ......... G06F 12/0246
711/103

* cited by examiner

*Primary Examiner* — Gurtej Bansal
(74) *Attorney, Agent, or Firm* — JCIPRNET

(57) ABSTRACT

The present invention relates to a memory management method, memory control circuit unit, and a memory storage device. The method includes: transmitting temporary data from a buffer memory to a register of a first memory plane; releasing a first storage space of the buffer memory, wherein the first storage space is configured to store the temporary data; performing a first operation to a second memory plane by using the first storage space; and after finishing the first operation performed on the second memory plane, reloading the temporary data from the register of the first memory plane to the first storage space of the buffer memory, wherein operations performed on the first memory plane and the second memory plane are asynchronous operations.

18 Claims, 11 Drawing Sheets

MEMORY MANAGEMENT METHOD FOR BUFFER MEMORY, AND MEMORY CONTROL CIRCUIT UNIT AND MEMORY STORAGE DEVICE USING THE SAME

CROSS-REFERENCE TO RELATED APPLICATION

This application claims the priority benefit of China application serial no. 201610736221.4, filed on Aug. 26, 2016. The entirety of the above-mentioned patent application is hereby incorporated by reference herein and made a part of this specification.

BACKGROUND

1. Technical Field

The present invention relates to a technique of managing memories, and particularly relates to a memory management method capable of temporarily increasing available spaces of a buffer memory and a memory control circuit unit and a memory storage device using the same.

2. Description of Related Art

The growth of digital cameras, mobile phones, and MP3 players has been rapid in recent years. Consequently, the consumers' demand for storage media has increased tremendously. A rewritable non-volatile memory module is one of the most adaptable memories for portable electronic products such as laptop computer due to its data non-volatility, low power consumption, small volume, non-mechanical structure and high read/write speed. A solid state drive is a storage apparatus adopting a flash memory module as storage medium. For these reasons, flash memory storage devices have become an import part of the electronic industries.

In the memory storage device using a rewritable non-volatile memory module as storage medium, normally, a buffer memory is also disposed, so as to temporarily store code or data. Due to the consideration of the cost, the capacity of such buffer memory is smaller. Therefore, when available spaces of the buffer memory is insufficient, Therefore, it is deemed necessary to develop a mechanism capable of fast and temporarily releasing the storage spaces of the buffer memory to perform operations that require more temporary spaces.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention provides a memory management method, a memory control circuit unit, and a memory storage device, capable of temporarily and quickly releasing the storage space of the buffer memory.

An exemplary embodiment provides a memory management method for a buffer memory of a memory storage device, wherein the memory storage device includes a rewritable non-volatile memory module, the rewritable non-volatile memory module includes a plurality of memory planes, and the memory planes are operated in parallel. The memory management method includes: transmitting temporary data from the buffer memory to a register of a first memory plane among the memory planes; and releasing a first storage space of the buffer memory, wherein the first storage space is configured to store the temporary data. The memory management method further includes using the first storage space to perform a first operation on a second storage plane among the memory planes; and after finishing the first operation performed on the second memory plane, reloading the temporary data from the register of the first memory plane to the first storage space of the buffer memory, wherein the operations performed on the first memory plane and the second memory plane are asynchronous operations.

An exemplary embodiment provides a memory control circuit unit for controlling a rewritable non-volatile memory module, wherein the rewritable non-volatile memory module includes a plurality of memory planes, and the memory planes are operated in parallel. The memory control circuit unit includes: a host interface configured to couple to a host system; a memory interface configured to couple to the rewritable non-volatile memory module; a buffer memory coupled to the host interface and the memory interface; and a memory management circuit coupled to the host interface, the memory interface, and the buffer memory. The memory management circuit is configured to transmit temporary data from the buffer memory to a register of a first memory plane among the memory planes. The memory management circuit is further configured to release a first storage space of the buffer memory, wherein the first storage space is configured to store the temporary data. The memory management circuit is further configured to uses the first storage space to perform a first operation on a second storage plane among the memory planes. After finishing the first operation performed on the second memory plane, the memory management circuit is further configured to reload the temporary data from the register of the first memory plane to the first storage space of the buffer memory, wherein the operations performed on the first memory plane and the second memory plane are asynchronous operations.

An exemplary embodiment provides a memory storage device. The memory storage device includes a connection interface unit configured to couple to a host system, a rewritable non-volatile memory module and a memory control circuit unit coupled to the connection interface unit and the rewritable non-volatile memory module. The rewritable non-volatile memory module includes a plurality of memory planes, and the memory planes are operated in parallel. The memory control circuit unit includes a buffer memory. The memory control circuit unit is configured to transmit temporary data from the buffer memory to a register of a first memory plane among the memory planes. The memory control circuit unit is further configured to release a first storage space of the buffer memory, wherein the first storage space is configured to store the temporary data. The memory control circuit unit is further configured to use the first storage space to perform a first operation on a second storage plane among the memory planes. After finishing the first operation performed on the second memory plane, the memory control circuit unit is further configured to reload the temporary data from the register of the first memory plane to the first storage space of the buffer memory, wherein the operations performed on the first memory plane and the second memory plane are asynchronous operations.

Based on the above, the memory management method, the memory control circuit unit, and the memory storage device provided in the exemplary embodiments are capable of temporarily releasing the storage space of the buffer memory. Particularly, because data is temporarily stored in a register of a memory plane of the rewritable non-volatile memory, the memory controller can perform operations on the physical erasing units of another memory plane by using the released storage space.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the present invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
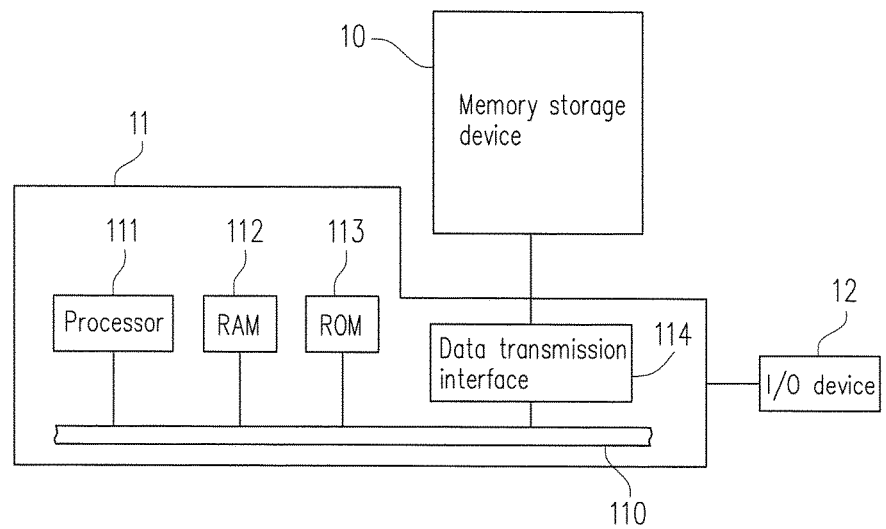
FIG. 1 is a schematic diagram illustrating a host system, a memory storage device and an I/O (input/output) device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (i.e. a memory storage system) includes a rewritable non-volatile memory module and a controller (i.e. a controlling circuit). The memory storage device is usually configured together with a host system so that the host system may write data into the memory storage device or read data from the memory storage device.

Figure 2:
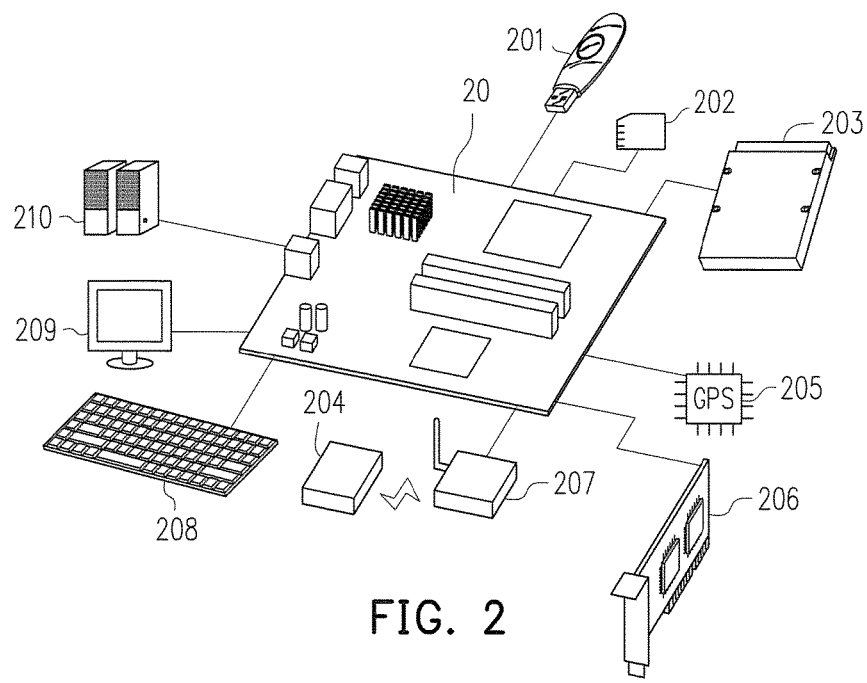
FIG. 2 is a schematic diagram illustrating a host system, a memory storage device and an I/O device according to another exemplary embodiment.

FIG. 1 is a schematic diagram illustrating a host system, a memory storage device and an I/O (input/output) device according to an exemplary embodiment, and FIG. 2 is a schematic diagram illustrating a host system, a memory storage device and an I/O device according to another exemplary embodiment.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 may write data into the memory storage device 10 or read data from the memory storage device 10 through the data transmission interface 114. Further, the host system 11 is coupled to an I/O device 12 through the system bus 110. For example, the host system 11 may transmit output signals to the I/O device 12 or receive input signals from I/O device 12 through the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a Bluetooth low energy memory storage device (e.g., iBeacon). Further, the main board 20 may also be coupled to I/O devices of various types including a GPS (Global Positioning System) module 205, a network interface card 206, a wireless transmission device 207, a keyboard 208, a monitor 209 and a speaker 210 through the system bus 110. For example, in an exemplary embodiment, the main board 20 may access the wireless memory storage device 204 through the wireless transmission device 207.

Figure 3:
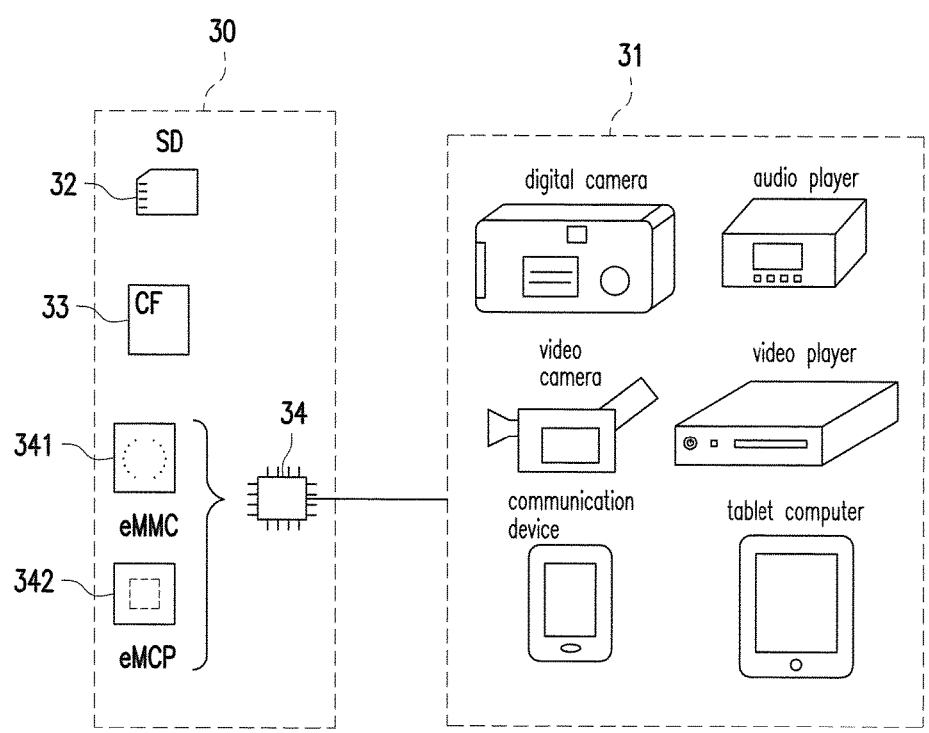
FIG. 3 is a schematic diagram illustrating a host system and a memory storage device according to another exemplary embodiment.

In exemplary embodiment, the host system may be any system capable of substantially cooperating with the memory storage device for storing data. Although the host system is illustrated as a computer system in foregoing exemplary embodiment, however, FIG. 3 is a schematic diagram illustrating a host system and a memory storage apparatus according to another exemplary embodiment. Referring to FIG. 3, in another exemplary embodiment, a host system 31 may also be a system including a digital camera, a video camera, a communication device, an audio player, a video player or a tablet computer, whereas a memory storage apparatus 30 may be various non-volatile memory storage apparatuses used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
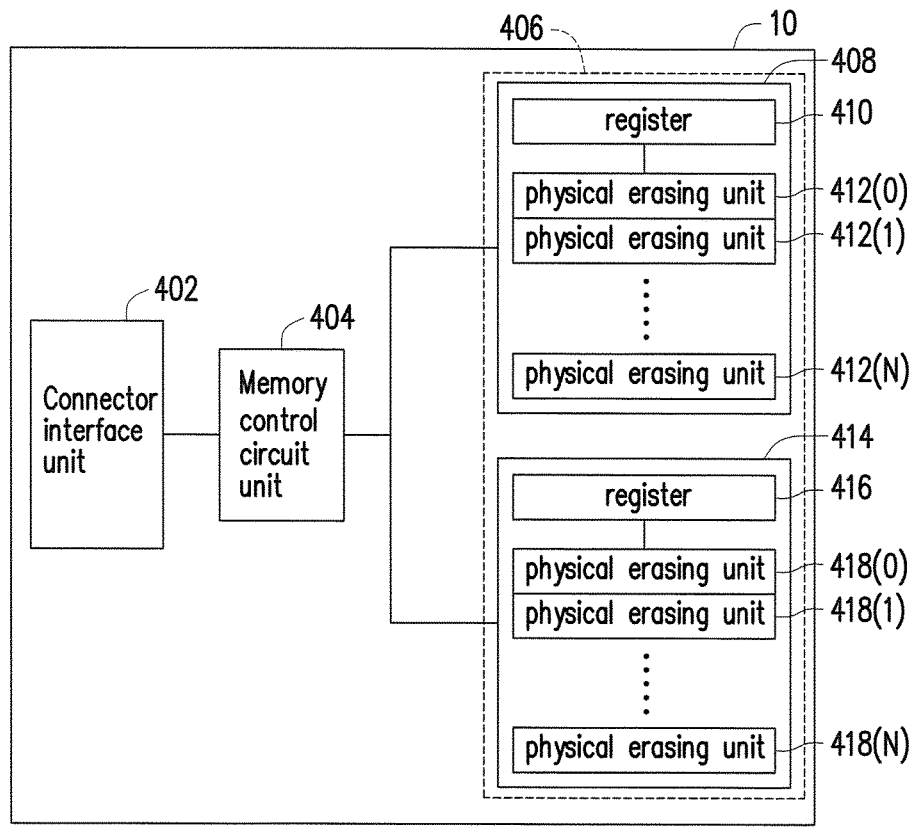
FIG. 4 is a schematic block diagram illustrating a memory storage device according to an exemplary embodiment.

FIG. 4 is a schematic block diagram illustrating a memory storage device according to an exemplary embodiment.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a SATA (Serial Advanced Technology Attachment) standard. Nevertheless, it should be understood that the invention is not limited thereto. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a Secure Digital (SD) interface standard, a CF (Compact Flash) interface standard, an IDE (Integrated Device Electronics) interface standard or other suitable standards. In the present exemplary embodiment, the connection interface unit 402 and the memory control circuit unit 404 may be packaged into one chip, or the connection interface unit 402 is distributed outside of a chip containing the memory control circuit unit.

The memory control circuit unit 404 is configured to execute a plurality of logic gates or control instructions which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the exemplary embodiment, the devices in the rewritable non-volatile memory module 406 are configured according to the memory planes in the memory dies of the rewritable non-volatile memory module 406. Specifically, the rewritable non-volatile memory module 406 may have one or more memory dies, each memory die has one or more memory planes, and each memory plane has a plurality of physical erasing units. During the manufacture of the rewritable non-volatile memory module 406, the manufacturer may lay out one or more memory planes into one device according to demands. In this way, the manufacturer may manage the whole rewritable non-volatile memory module 406 in a unit of each device. Particularly, the number of the memory planes included in each device is not limited in the present invention.

In the exemplary embodiment, the rewritable non-volatile memory module 406 includes a memory plane 408 (hereinafter referred to as a second storage plane) and a memory plane 414 (hereinafter referred to as a first memory plane). The memory plane 408 includes a register 410 and physical erasing units 412(0)~412(N).

The register 410 is configured to temporarily store data from the memory control circuit unit 404 or temporarily store data of the physical erasing units 412(0)~412(N). Specifically, the operation of writing data into the rewritable non-volatile memory module 406 includes two phases, that is, a data transmission and a data programming. In the phase of the data transmission, the memory management circuit 502 of the memory control circuit unit 404 transmits the data to be written in to the register 410. In the phase of the data programming, the data to be written in programmed from the register 410 into the physical erasing units 412(0)~412(N). In an exemplary embodiment, the register 410 may be a volatile memory such as a dynamic random access memory (DRAM). However, the register 410 may also be static a random access memory (SRAM), a Magnetoresistive Random Access Memory (MRAM), a Cache RAM, a synchronous dynamic random access memory (SDRAM), a Video RAM (VRAM), an embedded DRAM (eDRAM) or other memories. In another exemplary embodiment, the register 410 may be a non-volatile memory such as a NOR flash memory or other memories.

In addition, the physical erasing units 412(0)~412(N) respectively have a plurality of physical programming units, wherein the physical programming units belonging to the same physical erasing unit may be written independently or erased simultaneously. However, it should be noted that the present invention is not limited thereto. Each physical erasing unit may be composed of 64 or 256 physical programming units or any other number.

In the exemplary embodiment, the memory plane 414 includes a register 416 and physical erasing units 418(0)~418(N). The register 416 and the physical erasing units 418(0)~418(N) are similar to the register 410 and the physical erasing units 412(0)~412(N) of the memory plane 408. It should be mentioned that the number of the memory planes included in the rewritable non-volatile memory module 406 is not limited, and the number of the physical erasing units included in each memory planes is also not limited.

Generally speaking, the memory plane 408 and the memory plane 414 are operated in parallel. Specifically, when performing a write operation to write data into the rewritable non-volatile memory module 406, the memory management circuit 502 of the memory control circuit unit 404 may divide the data into a plurality of sub-data, and program the sub-data into the physical programming units of the memory plane 408 and the physical programming units of the memory plane 414 in parallel. In this way, the memory plane 408 and the memory plane 414 may be written simultaneously, and the efficiency of the write operation can be increased. When performing a read operation, the memory management circuit 502 of the memory control circuit unit 404 may read a plurality of sub-data from the memory plane 408 and the memory plane 414 in parallel (or simultaneously), and reorganize the sub-data into the original data. In addition, when performing an erase operation, the memory management circuit 502 of the memory control circuit unit 404 may also simultaneously erase data on the physical erasing units of the memory plane 408 and the physical erasing units of the memory plane 414 in parallel (or simultaneously).

That is, in general, the memory plane 408 and the memory plane 414 are operated simultaneously. Particularly, the present invention is not limited thereto. In an embodiment, the memory management circuit 502 of the memory control circuit unit 404 may also perform other operations on the memory plane 408 and the memory plane 414 in parallel (or simultaneously).

Figure 5:
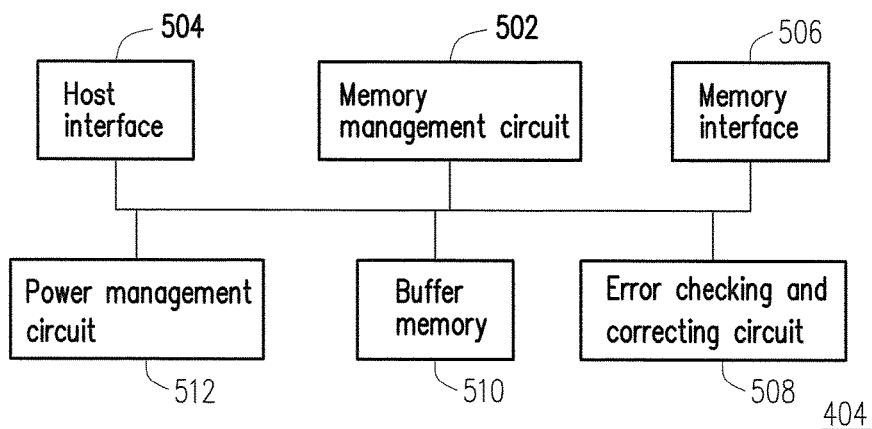
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504, and a memory interface 506.

The memory management circuit 502 is configured to control overall operations of the memory control circuit unit 404. Specifically, the memory management circuit 502 has a plurality of control instructions. During operations of the memory storage device 10, the control instructions are executed to perform various operations such as data writing, reading and erasing. Hereinafter, description for the execution of each operations of the memory management circuit 502 can be referred to as the execution of the operations of the memory control circuit unit 404.

In the present exemplary embodiment, the control instructions of the memory management circuit 502 are implemented in form of firmware. For instance, the memory management circuit 502 has a microprocessor unit (not illustrated) and a ROM (not illustrated), and the control instructions are burned into the ROM. When the memory storage device 10 operates, the control instructions are executed by the microprocessor to perform operations of writing, reading or erasing data.

In another exemplary embodiment, the control instructions of the memory management circuit 502 may also be stored as program codes in a specific area (for example, a system area used for storing system data) of the rewritable non-volatile memory module 406. In addition, the memory management circuit 502 has a microprocessor unit (not illustrated), the read only memory (not illustrated) and a random access memory (not illustrated). Particularly, the ROM has a boot code, which is executed by the microprocessor unit to load the control instructions stored in the rewritable non-volatile memory module 406 to the RAM of the memory management circuit 502 when the memory control circuit unit 404 is enabled. Then, the control instructions are executed by the microprocessor unit to perform operations of writing, reading or erasing data.

Further, in another exemplary embodiment, the control instructions of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells or a group thereof. The memory writing circuit is configured to issue a write command sequence for the rewritable non-volatile memory module 406 in order to write data into the rewritable non-volatile memory module 406. The memory reading circuit is configured to issue a read command sequence for the rewritable non-volatile memory module 406 in order to read data from the rewritable non-volatile memory module 406. The memory erasing circuit is configured to issue an erase command sequence for the rewritable non-volatile memory module 406 in order to erase data from the rewritable non-volatile memory module 406. The data processing circuit is configured to process both the data to be written into the rewritable non-volatile memory module 406 and the data to be read from the rewritable non-volatile memory module 406. Each of the write command sequence, the read command sequence and the erase command sequence may include one or more program codes or command codes, respectively, and instruct the rewritable non-volatile memory module 406 to perform the corresponding operations, such as writing, reading and erasing. In an exemplary embodiment, the memory management circuit 502 may further issue command sequences of other types to the rewritable non-volatile memory module 406 for instructing to perform the corresponding operations.

The host interface 504 is coupled to the memory management circuit 502 and configured to receive and identify commands and data sent from the host system 11. In other words, the commands and data sent from the host system 11 are passed to the memory management circuit 502 through the host interface 504. In the present exemplary embodiment, the host interface 504 is compatible with the SATA standard. However, it should be understood that the present disclosure is not limited thereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. That is, data to be written to the rewritable non-volatile memory module 406 is converted to a format acceptable to the rewritable non-volatile memory module 406 through the memory interface 506. Specifically, if the memory management circuit 502 intends to access the rewritable non-volatile memory module 406, the memory interface 506 sends corresponding command sequences. For example, the command sequences may include the write command sequence which instructs to write data, the read command sequence which instructs to read data, the erase command sequence which instructs to erase data, and corresponding command sequences configured to instruct performing various memory operations (e.g., for changing read voltage levels, performing a garbage collection operation, and so on). These command sequences are generated by the memory management circuit 502 and transmitted to the rewritable non-volatile memory module 406 through the memory interface 506, for example. The command sequences may include one or more signals, or data on the bus. The signals or the data may include command codes and programming codes. For example, in a read command sequence, information such as identification codes and memory addresses are included.

The error checking and correcting circuit 508 is coupled to the memory management circuit 502 and configured to perform an error checking and correcting process to ensure correctness of the data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data corresponding to the write command and the ECC and/or the EDC into the rewritable non-volatile memory module 406. Then, the memory management circuit 502 simultaneously reads the ECC and/or the EDC corresponding to the data when reading the data from the rewritable non-volatile memory module 406, and the error checking and correcting circuit 508 performs the error checking and correcting procedure on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control the power of the memory storage device 10.

Figure 6:
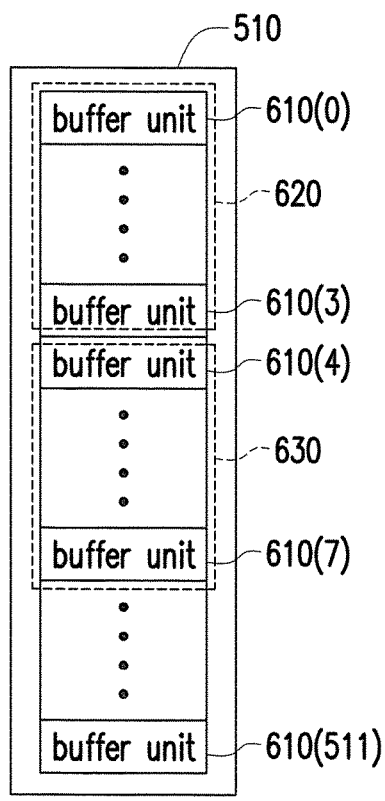
FIG. 6 is a schematic diagram illustrating a buffer memory according to an exemplary embodiment.

FIG. 6 is a schematic diagram illustrating a buffer memory according to an exemplary embodiment.

Referring to FIG. 6, in the exemplary embodiment, the buffer memory 510 has 512 buffer units (that is, buffer units 610(0)~610(511)), and the size of each buffer unit is 4 KB. Specifically, the size of 4 buffer units is corresponding to the size of one physical programming unit. In other word, in the exemplary embodiment, the size of one physical programming unit is 16 KB. For convenience of description, 4 buffer units are logically defined as a buffer unit set. For example, the buffer units 610(0)~610(3) of the buffer memory 510 may be logically defined as the buffer unit set 620, the buffer units 610(4)~610(7) may be logically defined as the buffer unit set 630, and so on. When the memory management circuit 502 read data from one physical programming unit, the data read from the physical programming unit is stored in one buffer unit. However, it should be noted that the number of the buffer units disposed in the buffer memory 510, the size of the buffer unit, the size of the physical programming unit and the size of the data transmitted by the host system 11 are not limited in the present exemplary embodiment. For example, in other exemplary embodiment, the number of the buffer units in the buffer memory 510 may be more or less than 512 buffer units. In addition, the host system 11 transmits or access data in a unit of 4 KB, for example. Or, in another exemplary embodiment, the size of the data transmitted or accessed each time by the host system 11 may also be more or less than 4 KB. Furthermore, the size of one physical programming unit is also not limited in the present invention, and in another exemplary embodiment, one buffer unit set may include more or less buffer units. In another exemplary embodiment, addresses of the buffer unit in the buffer unit set may also be discontinuous.

It should be noted that in the NAND flash memory module, the physical programming unit is composed of a plurality of memory cells arranged on the same word line. According to the number of bits able to be store in each memory cells, the NAND flash memory may be classified as the SLC NAND flash memory module, the MLC NAND flash memory module and the TLC NAND flash memory module, wherein each memory cells of the SLC NAND flash memory module can store data of 1 bit (that is, "1" and "0"), each memory cells of the MLC NAND flash memory module can store data of 2 bits, and each memory cells of the TLC NAND flash memory module can store data of 3 bits.

Because each memory cells of SLC NAND flash memory module can store data of 1 bit, therefore, in the SLC NAND flash memory module, the plurality of memory cells arranged on the same word line correspond to one physical programming unit.

Compared to the SLC NAND flash memory module, the floating gate storage layer of each memory cells of the MLC NAND flash memory module can store data of 2 bits, wherein each storage status (that is, "11", "10", "01" and "00") includes least significant bit (LSB) and most significant bit (MSB). For example, the value of the first bit counted from the left side in the storage status is LSB, and the value of the second bit counted from the left side is MSB. Therefore, the plurality of memory cells arranged on the same word line can form 2 physical programming units, wherein the physical programming unit formed by the LSB of the memory cells is referred to as lower physical programming unit, and the physical programming unit formed by the MSB of the memory cells is referred to as the upper physical programming unit. Particularly, when an error occurs in the programming of the upper physical programming unit, the data stored in the lower physical programming unit may be lost accordingly.

| Term | Abbreviation |
| --- | --- |
| physical programming unit | PPU |
| rewritable non-volatile memory | RNVM |
| bad block replacement operation | BBRO |
| physical erasing unit | PEU |
| memory management circuit | MMC |

In addition, in the 3D MLC NAND flash memory module, if the stable storage of the data on a word line needs to be assured, the programming on the upper PPU and the lower PPU need to be performed simultaneously. Particularly, in a case where the MMC 502 performs a pre-determined operation on the RNVM module 406, if the size of the storage space reserved for the pre-determined operation in the buffer memory 510 is the same as the size of one PPU and the pre-determined operation performs a write operation on the RNVM module 406, a write failure may be easily occurred. In other words, in this case, due to the capacity of the buffer memory 510, only one PPU can be written at a time, so a write failure may be easily occurred.

The above-mentioned pre-determined operation is, for example, a bad block replacement operation (BBRO, also referred to as bad PEU replacement operation) which is needed to be performed when a write failure occurs. Because the BBRO usually performs the write operation on a plurality of PPUs, the write fail may be easily occurred if the size of the storage space reserved for the BBRO in the buffer memory 510 is the same as the size of one PPU.

Because the BBRO is usually performed for one memory plane, in the exemplary embodiment, the available storage space in the buffer memory 510 can be temporarily increased to perform the BBRO by temporarily storing part of the data in the buffer memory 510 to a register of another memory plane.

FIG. 7A~FIG. 7E are schematic diagrams illustrating releasing part of the memory spaces of the buffer memory according to an exemplary embodiment.

Figure 7A:
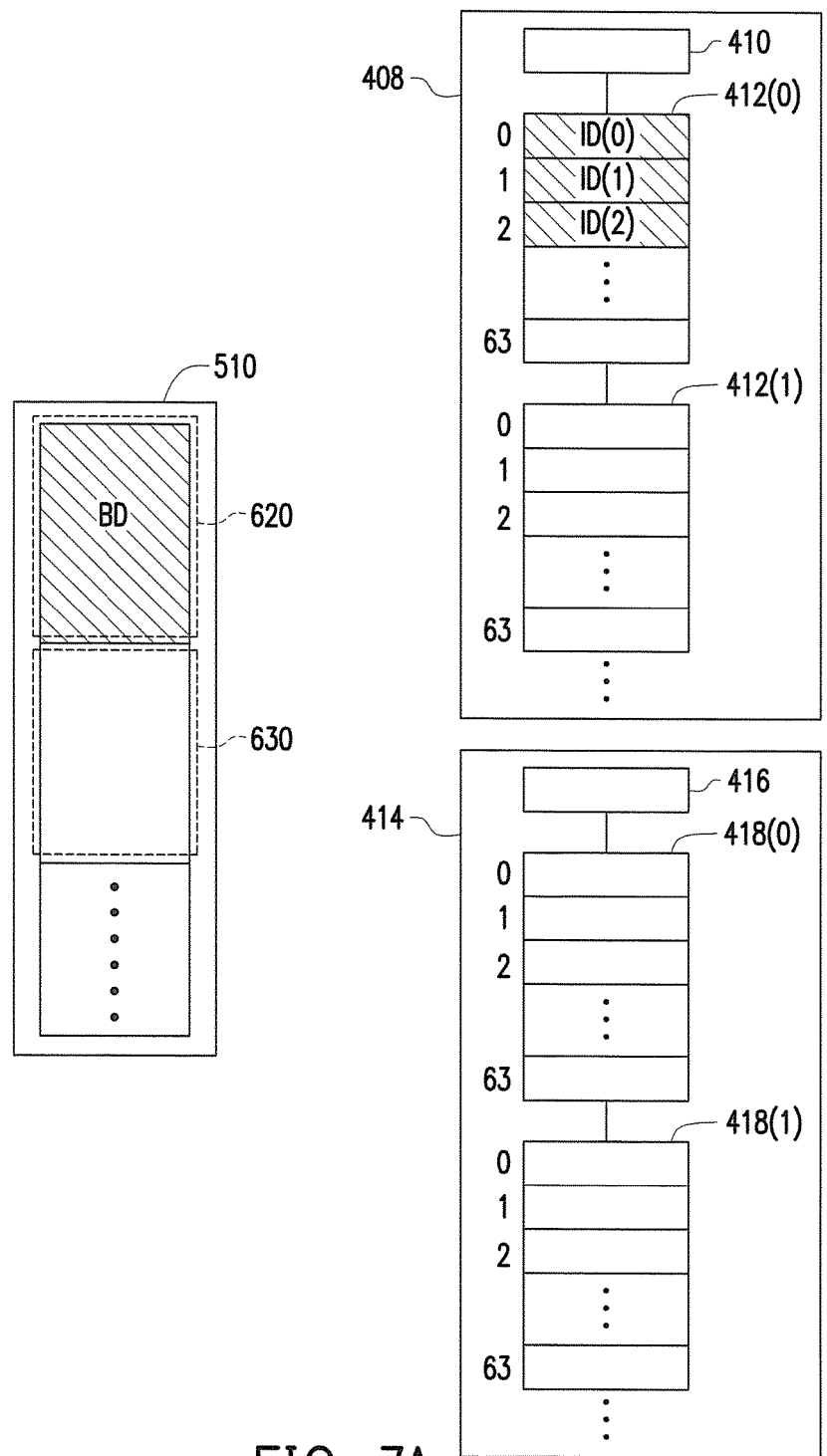
FIG. 7A~FIG. 7E are schematic diagrams illustrating releasing part of the memory spaces of the buffer memory according to an exemplary embodiment.

Referring to FIG. 7A, for the convenience of description, only part of the PEUs (that is, the PEUs 412(0)~412(1)) in the memory plane 408 and part of the PEUs (that is, the PEUs 418(0)~418(1)) in the memory plane 414 are illustrated. In addition, in the exemplary embodiment, it is assumed that one PEU has 64 PPUs.

Particularly, in FIG. 7A~FIG. 7E, the RNVM module 406 is MLC NAND flash memory module. That is, the PPUs of each PEU include a plurality of lower PPUs and a plurality of upper PPUs.

As illustrated in FIG. 7A, it is assumed that the temporary data BD is stored in the buffer unit set 620 of the buffer memory 510 and the buffer unit set 630 doesn't store any data. And, it is assumed that data ID(0)~ID(1) are successfully written in a 0th PPU of the PEU 412(0) (hereinafter referred to as the first PEU) and the first PPU of the PEU 412(0) respectively. The 0th PPU of the PEU 412(0) and the first PPU of the PEU 412(0) respectively are the lower PPU and the upper PPU formed by the same memory cells.

Then, if a write failure occurs when the MMC 502 performs the write operation to write the data ID(2) (hereinafter referred to as first data) into the second PPU of the PEU 412(0), the MMC 502 generates a write failure signal and performs the BBRO.

Figure 7B:
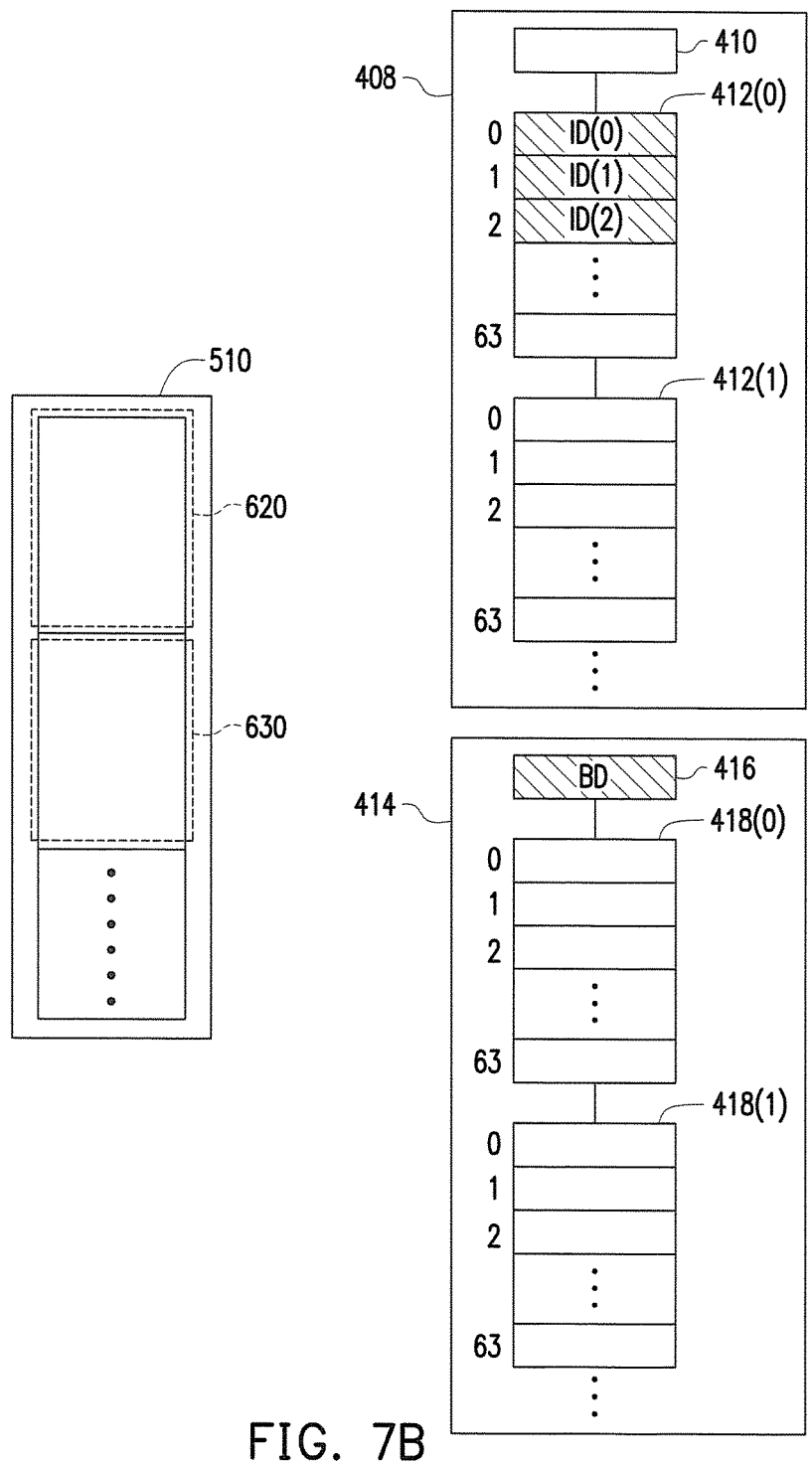

Specifically, referring to FIG. 7B, the MMC 502 transmits (or copies) the temporary data BD stored in the buffer unit set 620 of the buffer memory 510 to the register 416 of the memory plane 414. At this time, the MMC 502 can release the storage space (hereinafter referred to as the first storage space) of the buffer unit set 620 in the buffer memory 510. Then, the MMC 502 uses the storage space of the buffer unit set 620 and the storage space (hereinafter referred to as the second storage space) of the buffer unit set 630 to perform the BBRO on the memory plane 408.

Figure 7C:
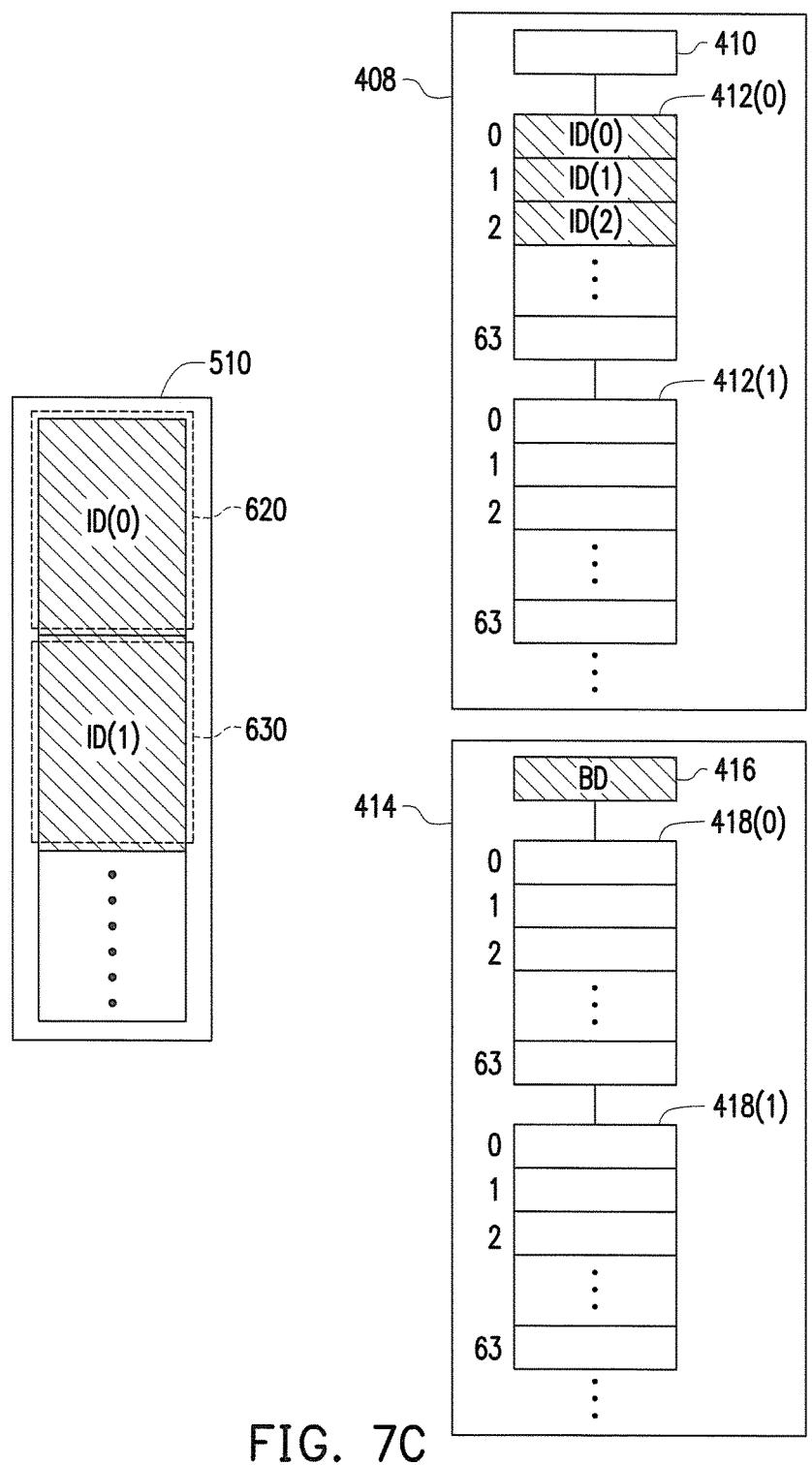
Figure 7D:
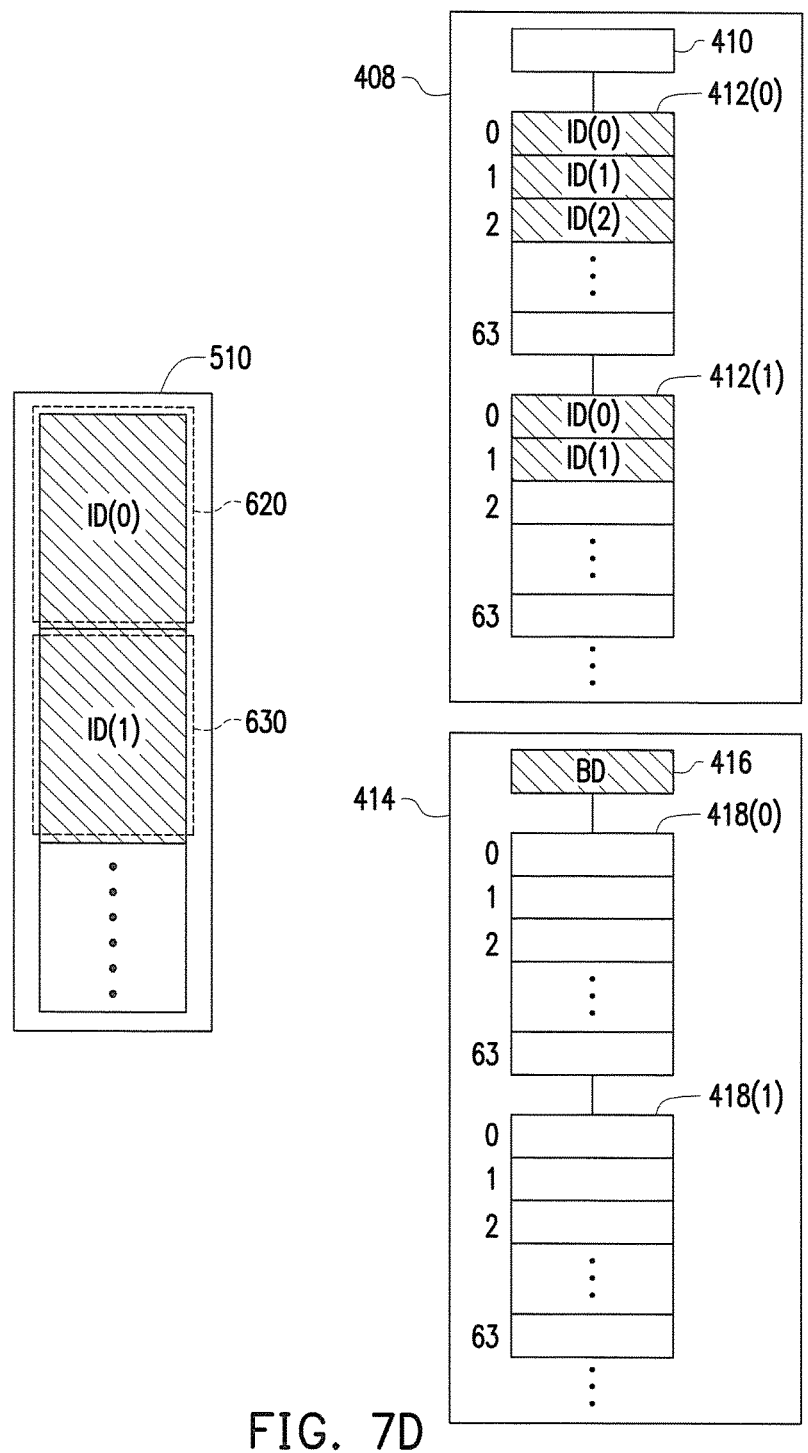

Referring to FIG. 7C, when the BBRO is performed, the MMC 502 copies the data ID(0) (hereinafter referred to as second data) and data ID(1) (hereinafter referred to as third data) successfully written in the PEU 412(0) to the buffer unit sets 620-630 of the buffer memory 510 respectively. Afterward, referring to FIG. 7D, the MMC 502 writes (or copies) the data ID(0)~ID(1) from the buffer unit sets 620-630 of the buffer memory 510 to the 0th PPU of the PEU 412(1) (hereinafter referred to as the second PEU) and the first PPU of the PEU 412(1) of the memory plane 408. The 0th PPU of the PEU 412(1) and the first PPU of the PEU 412(1) are respectively the lower PPU and the upper PPU formed by the same memory cells.

Figure 7E:
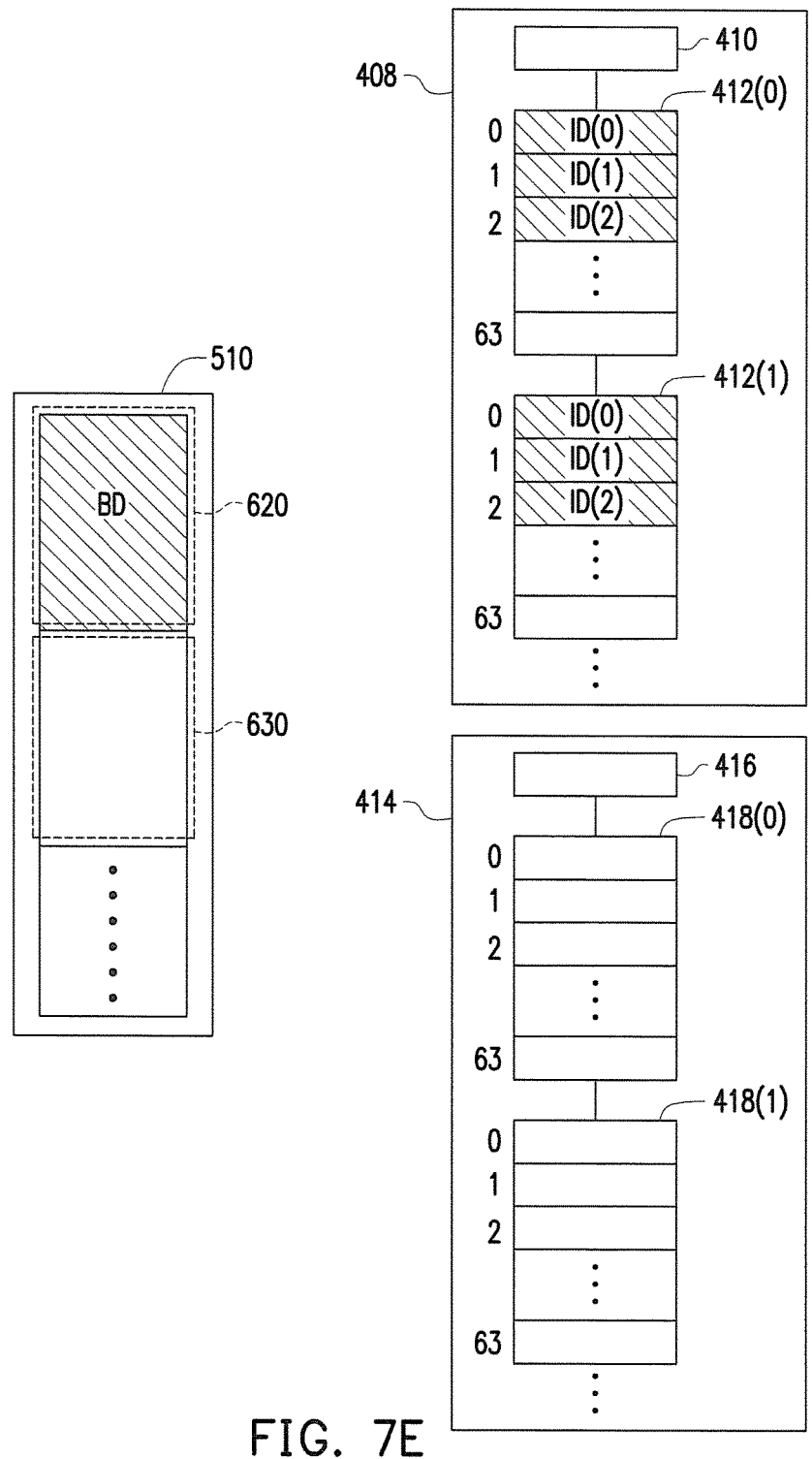

Referring to FIG. 7E, after the step of performing the BBRO on the memory plane 80 by using the storage spaces of the buffer unit sets 620~630, it is assumed that the data ID(0)~ID(1) are successfully written into the 0th PPU of the PEU 412(1) and the first PPU of the PEU 412(1). Afterward, the MMC 502 releases the storage spaces of the buffer unit sets 620-630, and reloads the temporary data BD from the register 416 of the memory plane 414 to the buffer unit set 620 of the buffer memory 510. In addition, the MMC 502 may continue to re-write the data ID(2) on which the write failure previously occurred to the second PPU of the PEU 412(1), and continue to perform other writing operations to write more data into the PEU 412(1).

Specifically, in the embodiment shown in FIG. 7B~FIG. 7E, the operations performed on the memory plane 408 and the memory plane 414 by the MMC 502 are asynchronous operations. In other words, after the MMC 502 transmits (or copies) the temporary data BD to the register 416 of the memory plane 414, the BBRO may be performed on the memory plane 408. And, when the BBRO is being performed on the memory plane 408, the MMC 502 does not perform the BBRO or other operations on the memory plane 414.

In addition, the above-mentioned embodiment where the temporary data in the buffer memory 510 is copied to a register of a memory plane and the operation is performed on another memory plane by using the released storage space in the buffer memory 510 may be applied to other operation. For example, in an exemplary embodiment, when a read error occurs during a read operation, the MMC 502 may perform the method of the present invention to temporarily increase the available storage space of the buffer memory 510, and perform a pre-determined operation needed for the read error.

Figure 8:
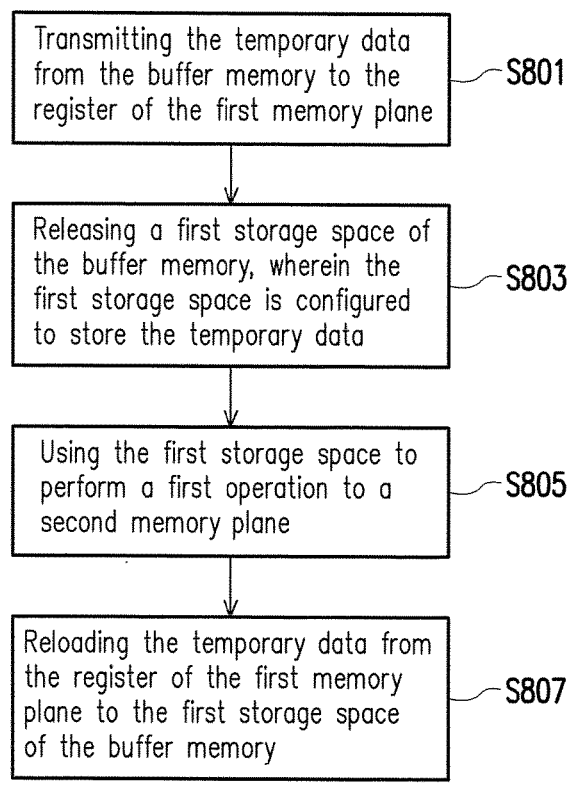
FIG. 8 is a flow chart illustrating a memory management method according to an exemplary embodiment.

FIG. 8 is a flow chart illustrating a memory management method according to an exemplary embodiment.

Referring to FIG. 8, in Step S801, the MMC 502 transmits temporary data from the buffer memory 510 to the register of the first memory plane. In Step S803, the MMC 502 releases the first storage space of the buffer memory 510, wherein the first storage space is configured to store the temporary data. In Step S805, the MMC 502 uses the first storage space to perform a first operation on the second storage plane. After finishing the first operation performed on the second memory plane, in Step S807, the MMC 502 reloads the temporary data from the register of the first memory plane to the first storage space of the buffer memory. Specifically, in Steps S801 to S807, the operations performed by the MMC 502 on the first memory plane and the second storage plane are asynchronous operations.

Figure 9:
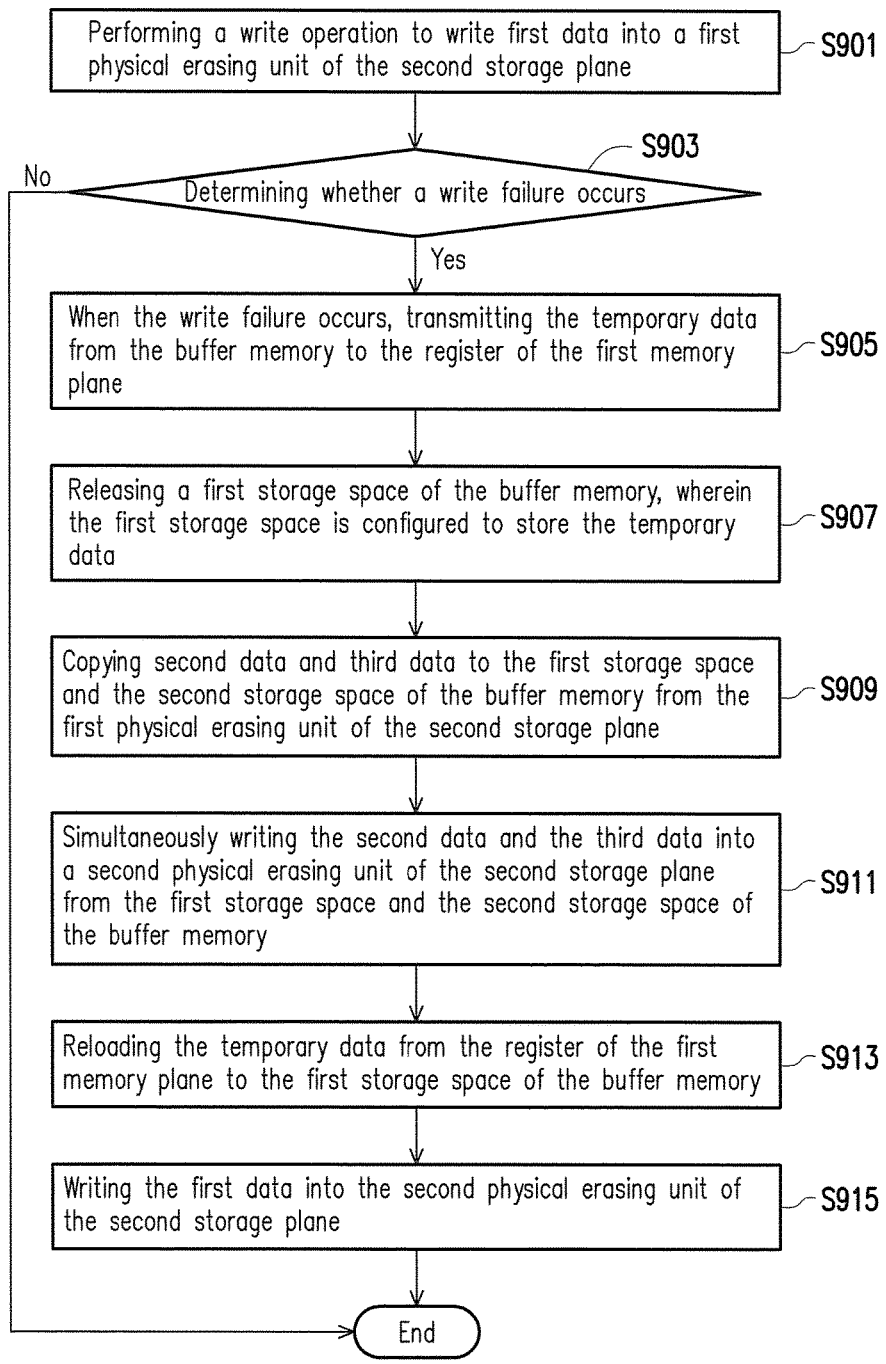
FIG. 9 is a flow chart illustrating a memory management method according to another exemplary embodiment.

FIG. 9 is a flow chart illustrating a memory management method according to another exemplary embodiment.

Referring to FIG. 9, in Step S901, the MMC 502 performs a write operation to write first data into the first PEU of the second storage plane. In Step S903, the MMC 502 determines whether the write failure occurs.

When the write failure does not occur, the process ends. For example, the MMC 502 may perform other operations according to commands.

When the write fail occurs, in Step S905, the MMC 502 transmits the temporary data from the buffer memory 510 to the register of the first memory plane. Particularly, in Step S905, the MMC 502 instructs the RNVM 406 not to program the temporary data to the memory erase unit of the first memory plane.

Then, in Step S907, the MMC 502 releases a first storage space of the buffer memory 510, wherein the first storage space is configured to store the temporary data. In Step S909, the MMC 502 copies second data and third data to the first storage space and the second storage space of the buffer memory from the first PEU of the second storage plane. In Step S911, the MMC 502 simultaneously writes the second data and the third data into the second PEU of the second storage plane from the first storage space and the second storage space of the buffer memory. In Step S913, the MMC 502 reloads the temporary data from the register of the first memory plane to the first storage space of the buffer memory 510. Finally, in Step S915, the MMC 502 writes the first data into the second PEU of the second storage plane. Specifically, in Steps S905 to S915, the operations performed by the MMC 502 on the first memory plane and the second storage plane are asynchronous operations.

Based on the above, the memory management method, memory control circuit unit, and memory storage device are capable of temporarily releasing the storage space of the buffer memory. And, because the data is temporarily stored in a register of a memory plane of the RNVM, the memory controller can perform operations on the PEU of another memory plane by using the storage space of the buffer memory. Therefore, available storage spaces of the buffer memory can be increased temporarily. The previously described exemplary embodiments of the present invention have the advantages aforementioned, wherein the advantages aforementioned not required in all versions of the invention.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory management method for a buffer memory of a memory storage device, wherein the memory storage device has a rewritable non-volatile memory module, the rewritable non-volatile memory module has a plurality of memory planes, and the memory planes are operated in parallel, the memory management method comprising:
   transmitting a temporary data from the buffer memory to a register of a first memory plane among the memory planes;
   releasing a first storage space of the buffer memory, wherein the first storage space is configured to store the temporary data;
   using the first storage space to perform a first operation on a second memory plane among the memory planes; and
   after finishing the first operation performed on the second memory plane, reloading the temporary data from the register of the first memory plane to the first storage space of the buffer memory,
   wherein operations performed on the first memory plane and the second memory plane are asynchronous operations.

2. The memory management method according to claim 1, wherein each of the memory planes has a plurality of physical erasing units, the memory management method further comprising:
   before the step of transmitting the temporary data from the buffer memory to the register of the first memory plane,
   performing a write operation to write first data into a first physical erasing unit of the second memory plane; and
   when a write failure signal corresponding to the write operation is generated, performing the step of transmitting the temporary data from the buffer memory to the register of the first memory plane.

3. The memory management method according to claim 1, wherein a size of the first storage space of the buffer memory is 16 kilobytes.

4. The memory management method according to claim 1, wherein the step of using the first storage space to perform the first operation by comprising:
   using the first storage space and a second storage space of the buffer memory to perform the first operation on the second memory plane.

5. The memory management method according to claim 4, wherein the step of using the first storage space and the second storage space of the buffer memory to perform the first operation on the second memory plane comprising:
   copying a second data and a third data to the first storage space and the second storage space of the buffer memory from the first physical erasing unit of the second memory plane; and
   simultaneously writing the second data and the third data into a second physical erasing unit of the second memory plane from the first storage space and the second storage space of the buffer memory.

6. The memory management method according to claim 5, further comprising:
   writing the first data into the second physical erasing unit of the second memory plane.

7. A memory control circuit unit for controlling a rewritable non-volatile memory module, wherein the rewritable non-volatile memory module comprises a plurality of memory planes, the memory planes are operated in parallel, the memory control circuit unit comprising:
   a host interface configured to couple to a host system;
   a memory interface configured to couple to the rewritable non-volatile memory module;
   a buffer memory coupled to the host interface and the memory interface; and
   a memory management circuit coupled to the host interface, the memory interface, and the buffer memory,
   wherein the memory management circuit is configured to transmit a temporary data from the buffer memory to a register of a first memory plane of the memory planes,
   wherein the memory management circuit is further configured to release a first storage space of the buffer memory, wherein the first storage space is configured to store the temporary data,
   wherein the memory management circuit is further configured to use the first storage space to perform a first operation on a second memory plane of the memory planes,
   after finishing the first operation performed on the second memory plane, the memory management circuit is further configured to reload the temporary data from the register of the first memory plane to the first storage space of the buffer memory,
   wherein operations performed on the first memory plane and the second memory plane are asynchronous operations.

8. The memory control circuit unit according to claim 7, wherein each of the memory planes has a plurality of physical erasing units,
   wherein before the operation of transmitting the temporary data from the buffer memory to the register of the first memory plane,
   the memory management circuit is further configured to perform a write operation to write first data into a first physical erasing unit of the second memory plane,
   when a write failure signal corresponding to the write operation is generated, the memory management circuit performs the operation of transmitting the temporary data from the buffer memory to the register of the first memory plane.

9. The memory control circuit unit according to claim 7, wherein a size of the first storage space of the buffer memory is 16 kilobytes.

10. The memory control circuit unit according to claim 7, wherein in the operation of using the first storage space to perform the first operation,
    the memory management circuit is further configured to use the first storage space and a second storage space of the buffer memory to perform the first operation on the second memory plane.

11. The memory control circuit unit according to claim 10, wherein in the operation of using the first storage space and the second storage space of the buffer memory to perform the first operation on the second memory plane,
    the memory management circuit is further configured to copy a second data and a third data to the first storage space and the second storage space of the buffer memory from the first physical erasing unit of the second memory plane, the memory management circuit is further configured to simultaneously write the second data and the third data into a second physical erasing unit of the second memory plane from the first storage space and the second storage space of the buffer memory.

12. The memory control circuit unit of claim 11, wherein the memory management circuit is further configured to write the first data into the second physical erasing unit of the second memory plane.

13. A memory storage device, comprising:
a connection interface unit configured to couple to a host system;
a rewritable non-volatile memory module, wherein the rewritable non-volatile memory module comprises a plurality of memory planes, and the memory planes are operated in parallel; and
a memory control circuit unit coupled to the connection interface unit and the rewritable non-volatile memory module, wherein the memory control circuit unit comprises a buffer memory,
wherein the memory control circuit unit is configured to transmit a temporary data from the buffer memory to a register of a first memory plane of the memory planes,
wherein the memory control circuit unit is further configured to release a first storage space of the buffer memory, wherein the first storage space is configured to store the temporary data,
wherein the memory control circuit unit is further configured to use the first storage space to perform a first operation on a second memory plane of the memory planes,
after finishing the first operation performed on the second memory plane, the memory control circuit unit is further configured to reload the temporary data from the register of the first memory plane to the first storage space of the buffer memory,
wherein operations performed on the first memory plane and the second memory plane are asynchronous operations.

14. The memory storage device according to claim 13, wherein each of the memory planes has a plurality of physical erasing units,
wherein before the operation of transmitting the temporary data from the buffer memory to the register of the first memory plane,
the memory control circuit unit is further configured to perform a write operation to write a first data into a first physical erasing unit of the second memory plane,
when a write failure signal corresponding to the write operation is generated, the memory control circuit unit performs the operation of transmitting the temporary data from the buffer memory to the register of the first memory plane.

15. The memory storage device according to claim 13, wherein a size of the first storage space of the buffer memory is 16 kilobytes.

16. The memory storage device according to claim 13, wherein in the operation of using the first storage space to perform the first operation,
the memory control circuit unit is further configured to use the first storage space and a second storage space of the buffer memory to perform the first operation on the second memory plane.

17. The memory storage device according to claim 16, wherein in the operation of using the first storage space and the second storage space of the buffer memory to perform the first operation on the second memory plane,
the memory control circuit unit is further configured to copy a second data and a third data to the first storage space and the second storage space of the buffer memory from the first physical erasing unit of the second memory plane,
the memory control circuit unit is further configured to simultaneously write the second data and the third data into a second physical erasing unit of the second memory plane from the first storage space and the second storage space of the buffer memory.

18. The memory storage device according to claim 17, wherein
the memory control circuit unit is further configured to write the first data into the second physical erasing unit of the second memory plane.

* * * * *